United States Patent
Hagiwara et al.

(10) Patent No.: US 8,221,535 B2
(45) Date of Patent: Jul. 17, 2012

(54) TIN-DOPED INDIUM OXIDE FINE PARTICLE DISPERSION, METHOD FOR MANUFACTURING THE SAME, INTERLAYER FILM FOR LAMINATED GLASS WITH HEAT RAY BLOCKING PROPERTIES FORMED BY USING SAID DISPERSION, AND LAMINATED GLASS THEREWITH

(75) Inventors: Masahiro Hagiwara, Kurihara (JP); Takeshi Nakagawa, Kashima-gun (JP); Juichi Fukatani, Ritto (JP); Tadahiko Yoshioka, Kawasaki (JP); Bungo Hatta, Koka (JP)

(73) Assignees: Mitsubishi Materials Corporation, Akita-Ken (JP); Jemco Inc., Akita-Ken (JP); Sekisui Chemical Co., Ltd., Osaka (JP)

( * ) Notice: Subject to any disclaimer, the term of this patent is extended or adjusted under 35 U.S.C. 154(b) by 427 days.

(21) Appl. No.: 10/550,259

(22) PCT Filed: Jun. 11, 2004

(86) PCT No.: PCT/JP2004/008576
§ 371 (c)(1),
(2), (4) Date: Sep. 21, 2005

(87) PCT Pub. No.: WO2005/061405
PCT Pub. Date: Jul. 7, 2005

(65) Prior Publication Data
US 2006/0225614 A1 Oct. 12, 2006

(30) Foreign Application Priority Data
Dec. 24, 2003 (JP) .................................. 2003-427446

(51) Int. Cl.
*C23C 16/40* (2006.01)
*C08K 3/22* (2006.01)
*B32B 17/10* (2006.01)

(52) U.S. Cl. ......... 106/287.19; 106/287.23; 106/287.24; 106/287.26; 106/287.29; 106/287.3; 428/436; 428/437; 524/413; 524/430

(58) Field of Classification Search .................. 428/436, 428/437; 524/413, 430; 106/287.19, 287.23, 106/287.24, 287.26, 287.29, 287.3
See application file for complete search history.

(56) References Cited

U.S. PATENT DOCUMENTS

| | | | |
|---|---|---|---|
| 4,027,069 A * | 5/1977 | Mont et al. ..................... 428/437 |
| 5,504,133 A | 4/1996 | Murouchi et al. |
| 5,518,810 A | 5/1996 | Nishihara et al. |
| 5,807,511 A | 9/1998 | Kunimatsu et al. |
| 6,329,061 B2 * | 12/2001 | Kondo .......................... 428/432 |
| 6,673,456 B1 * | 1/2004 | Kobata et al. ................. 428/437 |
| 2001/0016261 A1 | 8/2001 | Kondo |
| 2002/0045050 A1 | 4/2002 | Tamai et al. |
| 2003/0021994 A1 | 1/2003 | Kawamoto et al. |

FOREIGN PATENT DOCUMENTS

| | | |
|---|---|---|
| EP | 1227070 A1 | 7/2002 |
| JP | 7-70482 A | 3/1995 |
| JP | 3040681 B2 | 3/2000 |
| JP | 2001-233643 A | 8/2001 |
| JP | 2001-302289 A | 10/2001 |
| JP | 2002-293583 A | 10/2002 |
| JP | 2002-326846 A | 11/2002 |
| WO | WO 01/25162 A1 | 4/2001 |
| WO | WO 01/42158 A1 | 6/2001 |
| WO | WO 01/44132 A1 | 6/2001 |
| WO | WO 01/91136 A1 | 11/2001 |

OTHER PUBLICATIONS

Russian Patent Office Decision on Grant issued on Jul. 25, 2008 for Application No. 2006126343.
Action issued by the Government of India Patent Office in Indian Patent Application No. 2020/KOLNP/2006 on Nov. 6, 2009.

* cited by examiner

*Primary Examiner* — D. S. Nakarani
(74) *Attorney, Agent, or Firm* — Sughrue Mion, PLLC

(57) ABSTRACT

A dispersion of tin-doped indium oxide fine particles has tin-doped indium oxide fine particles, a plasticizer for an interlayer film, an organic solvent containing alcohols as a main component, and a dispersion stabilizer, wherein under measuring conditions of a concentration of tin-doped indium oxide fine particles of 0.7% by weight and an optical path length of a glass cell of 1 mm, a visible light transmittance is 80% or more, a solar radiation transmittance at a wavelength within a range from 300 nm to 2100 nm is ¾ or less of the visible light transmittance, a haze value is 1.0% or less, and a reflection yellow index is −20 or more.

13 Claims, No Drawings

TIN-DOPED INDIUM OXIDE FINE PARTICLE DISPERSION, METHOD FOR MANUFACTURING THE SAME, INTERLAYER FILM FOR LAMINATED GLASS WITH HEAT RAY BLOCKING PROPERTIES FORMED BY USING SAID DISPERSION, AND LAMINATED GLASS THEREWITH

TECHNICAL FIELD

The present invention relates to a dispersion of tin-doped indium oxide fine particles, which can be used in the manufacture of an interlayer film for laminated glass, to a method for manufacturing the dispersion, to an interlayer film for laminated glass with heat ray shield properties, and a laminated glass therewith.

This application claims priority on Japanese Patent Application No. 2003-427446 filed on Dec. 24, 2003, the contents of which are incorporated herein by reference.

BACKGROUND ART

In general, a laminated glass has a structure obtained by interposing an interlayer film for laminated glass (hereinafter also referred to simply as an interlayer film) including a polyvinyl acetal resin such as polyvinyl butyral resin plasticized by a plasticizer between at least a pair of glass sheets, and integrating them. The laminated glass having such a structure is excellent in safety because fragments of glass hardly scatter when broken by an exterior impact, and therefore it is widely used as a window glass for vehicles such as automobiles and aircrafts, and for buildings.

However, such a laminated glass including an interlayer film was excellent in safety, but was inferior in heat shield properties. In general, infrared radiation having a wavelength of 780 nm or more, which is longer than that of visible light, is referred to as heat ray because, inspite of its small energy amount such as about 10% as compared with ultraviolet radiation, it has a large thermal action and is released as heat to cause temperature rise when absorbed by a substance. A laminated glass capable of effectively shielding this heat ray has been required. When it becomes possible to shield infrared radiations having a large thermal action among light rays incident upon automotive front and side glasses, heat shield properties are enhanced and thus temperature rise in the automobile can be suppressed. Since the area of the automotive glass portion tends to increase, recently, it has become necessary to enhance heat shield properties of the laminated glass, thereby imparting a heat ray shield function to the glass opening portion.

As the laminated glass having enhanced heat shield properties, for example, there has been known a laminated glass including an interlayer film having a transparent resin mixed with a plasticizer containing tin-doped indium oxide fine particles (hereinafter also referred to as ITO fine particles) to a transparent resin (see Patent Document 1: Japanese Patent No. 3,040,681). This publication discloses, as the interlayer film for laminated glass, an interlayer film obtained by mixing ITO fine particles having a particle size limited to 0.1 μm or less so as not to impair transparency, an anionic surfactant and phthalic acid di-2-ethylhexyl as a plasticizer to prepare a dispersion of ITO fine particles containing ITO fine particles dispersed therein, kneading the dispersion with a polyvinyl butyral resin, and forming the kneaded mixture into a film.

As an interlayer film composition for laminated glass having heat shield properties, there has been known a composition obtained by mixing a dispersion containing ITO fine particles, a higher fatty acid ester, and a plasticizer with a resin (see Patent Document 2: Japanese Patent Application, First Publication No. 2001-233643). In the case of this interlayer film composition, the higher fatty acid ester such as polyglycerin fatty acid ester is added so as to enhance dispersibility of ITO fine particles.

However, a conventional interlayer film for laminated glass composition, or a dispersion of ITO fine particles used for the interlayer film composition may be inferior in transparency because clouding occurs at a certain angle, inspite of the same haze value as an indicator of transparency. Also, there is a problem in that, when using a conventional dispersant in the case of dispersing ITO fine particles in the plasticizer, it becomes difficult to control the degree of adhesion at the interface between the glass and the interlayer film of the laminated glass. Also, there is a problem in that it becomes difficult to control a variation in the degree of adhesion between the glass and the interlayer film due to a change in moisture of the interlayer film. Furthermore, there is a problem in that, when the dispersion of ITO fine particles is diluted with a plasticizer for an interlayer film, ITO fine particles are converted into agglomerated particles due to poor dispersion, that is, so-called solvent shock phenomenon arises and thus transparency is lowered.

There have been known a composition obtained by adding triethylene glycol di-2-hexanoate (3GO) as a plasticizer to a solution containing ITO fine particles dispersed in polyphosphate ester and acetylacetone (see Patent Document 3: Japanese Patent Application, First Publication No. 2002-293583) and a composition obtained by further mixing the composition with 2-ethylhexanoic acid (see Patent Document 4: Japanese Patent Application, First Publication No. 2001-302289). However, all of these compositions have a drawback in that they are free of alcohols and have high hydrophobicity, and thus ITO fine particles are inferior in affinity with the solution and solvent shock may arise. Also, there is a drawback in that dispersion propety drastically vary depending on the kind of the plasticizer for the interlayer film.

DISCLOSURE OF THE INVENTION

The present invention has been made so as to solve the above problems of the prior art with respect to a dispersion of ITO fine particles having heat ray shield properties, and an interlayer film including the dispersion. The present invention provides a dispersion of ITO fine particles having excellent transparency and heat shield properties by adjusting the haze value to a fixed value or less, and controlling a reflection value measured by a goniophotometric measurement as an indicator and a reflection yellow index (YI) having a correlation with the measured reflection value as an indicator within a fixed range, and also provides an interlayer film including the dispersion of ITO fine particles, and a heat ray shield laminated glass including the interlayer film.

Furthermore, the present invention provides a dispersion of ITO fine particles which easily adjusts the degree of adhesion due to a combination of dispersion stabilizers, which is excellent in dispersibility of ITO fine particles, which easily suppresses a variation in the degree of adhesion at the interface between the glass and the interlayer film due to a change in moisture of the interlayer film, and which is also less likely to cause solvent shock, and also provides an interlayer film including the dispersion of ITO fine particles, and a heat ray shield laminated glass including the interlayer film.

The present invention relates to the following dispersion of tin-doped indium oxide fine particles, and to a method for manufacturing the same.

(1) A dispersion of tin-doped indium oxide fine particles, the dispersion includes tin-doped indium oxide fine particles, a plasticizer for an interlayer film, an organic solvent containing alcohols as a main component, and a dispersion stabilizer, wherein under measuring conditions of the concentration of tin-doped indium oxide fine particles of 0.7% by weight and an optical path length of a glass cell of 1 mm, a visible light transmittance is 80% or more, a solar radiation transmittance at a wavelength within a range from 300 nm to 2100 nm is ¾ or less of the visible light transmittance, a haze value is 1.0% or less, and a reflection yellow index is −20 or more.

In this case, there can be obtained a dispersion of tin-doped indium oxide fine particles which is excellent in dispersibility of tin-doped indium oxide fine particles and has high transparency at a certain angle, and which is also less likely to cause solvent shock and maintains good dispersion state of tin-doped indium oxide fine particles when the dispersion is mixed with the resin. This dispersion of tin-doped indium oxide fine particles is suited for the manufacture of an interlayer film for laminated glass, and an interlayer film for laminated glass with excellent heat ray shield properties and a laminated glass including the same can be obtained by using the dispersion.

(2) The dispersion of tin-doped indium oxide fine particles according to (1), wherein instead of the reflection yellow index being −20 or more, or with the reflection yellow index being −20 or more, under measuring conditions of an optical path length of a glass cell of 1 mm, a reflection value measured at 0 degrees among reflected light distribution at an incidence angle of 45 degrees measured by a goniophotometric measurement is 30 or less.

(3) The dispersion of tin-doped indium oxide fine particles according to (1), wherein the plasticizer for an interlayer film is at least one selected from the group consisting of dihexyl adipate, triethylene glycol di-2-ethylhexanoate, tetraethylene glycol di-2-ethylhexanoate, triethylene glycol di-2-ethyl butyrate, tetraethylene glycol di-2-ethyl butyrate, tetraethylene glycol di-heptanoate, and triethylene glycol di-heptanoate.

(4) The dispersion of tin-doped indium oxide fine particles according to (1), wherein the alcohols include at least one selected from the group consisting of methanol, ethanol, propanol, isopropanol, n-butanol, isobutanol, sec-butanol, tert-butanol, lauryl alcohol, diacetone alcohol, cyclohexanol, ethylene glycol, diethylene glycol and triethylene glycol.

(5) The dispersion of tin-doped indium oxide fine particles according to (1), wherein the dispersion stabilizer is a compound having at least one atom selected from the group consisting of nitrogen, phosphorus, and chalcogen atoms.

(6) The dispersion of tin-doped indium oxide fine particles according to (5), wherein the dispersion stabilizer is at least one selected from the group consisting of sulfate ester-based compound, phosphate ester-based compound, ricinoleic acid, polyricinoleic acid, polycarboxylic acid, polyhydric alcohol type surfactant, polyvinyl alcohol, and polyvinyl butyral.

(7) The dispersion of tin-doped indium oxide fine particles according to (1), wherein the dispersion stabilizer is at least one selected from the group consisting of chelate, inorganic acid and organic acid.

(8) The dispersion of tin-doped indium oxide fine particles according to (1), wherein the dispersion of tin-doped indium oxide fine particles contains, as the dispersion stabilizer, three components of phosphate ester-based compound, organic acid, and chelate.

(9) The dispersion of tin-doped indium oxide fine particles according to (1), wherein a concentration of the ITO fine particles is from 0.1 to 95% by weight, a content of the plasticizer for an interlayer film is from 1 to 99.9% by weight, a content of the organic solvent containing alcohols as a main component is from 0.02 to 25% by weight, and a content of the dispersion stabilizer is from 0.0025 to 30% by weight.

(10) The dispersion of tin-doped indium oxide fine particles according to (1), wherein the dispersion of tin-doped indium oxide fine particles is obtained by diluting a dispersion of tin-doped indium oxide fine particles which contains tin-doped indium oxide fine particles, a plasticizer for an interlayer film, an organic solvent containing alcohols as a main component, and a dispersion stabilizer, and in which a concentration of the tin-doped indium oxide fine particles is from 0.1 to 95% by weight, with a plasticizer for an interlayer film, or a plasticizer for an interlayer film containing an organic solvent containing alcohols as a main component and/or a dispersion stabilizer.

(11) The dispersion of tin-doped indium oxide fine particles according to (1), wherein, when a concentration of the tin-doped indium oxide fine particles is adjusted to 10.0% by weight by diluting a dispersion of tin-doped indium oxide fine particles having the concentration of the tin-doped indium oxide fine particles of 10.0% by weight or more, or when a concentration of the tin-doped indium oxide fine particles is adjusted to 40.0% by weight by diluting a dispersion of tin-doped indium oxide fine particles having the concentration of the tin-doped indium oxide fine particles of 40.0% by weight or more, a mean volume particle size of the tin-doped indium oxide fine particles is 80 nm or less, and a particle size at 90% accumulation (D90) is 160 nm or less.

(12) The dispersion of tin-doped indium oxide fine particles according to (1), wherein a primary average particle size of the tin-doped indium oxide fine particles is 0.2 μm or less.

(13) The dispersion of tin-doped indium oxide fine particles according to (1), wherein a lattice constant of a tin-doped indium oxide fine particle crystal is from 10.11 to 10.16 Å.

(14) A method for manufacturing the dispersion of tin-doped indium oxide fine particles of any one of (1) to (13), includes mixing an organic solvent containing alcohols as a main component, a dispersion stabilizer, tin-doped indium oxide fine particles and plasticizer for an interlayer film, thereby dispersing the tin-doped indium oxide fine particles.

(15) The method for manufacturing a dispersion of tin-doped indium oxide fine particles according to (14), wherein a mixed solution containing the organic solvent containing the alcohols as a main component, the dispersion stabilizer, and the tin-doped indium oxide fine particles is prepared, and this mixed solution is mixed with the plasticizer for an interlayer film to obtain a dispersion of tin-doped indium oxide fine particles.

(16) The method for manufacturing a dispersion of tin-doped indium oxide fine-particles according to (15), wherein the mixed solution containing the organic solvent containing the alcohols as a main component, the dispersion stabilizer, and the tin-doped indium oxide fine particles is prepared, and this mixed solution is added to the plasticizer for an interlayer film, or the plasticizer for an interlayer film is added to this mixed solution, thereby dispersing the tin-doped indium oxide fine particles.

(17) The method for manufacturing a dispersion of tin-doped indium oxide fine particles according to (15), wherein a plasticizer containing an organic solvent containing alcohols as a main component or a dispersion stabilizer is used as the plasticizer for an interlayer film.

Also, the present invention relates to the following interlayer film for laminated glass with heat ray shield properties, and to a laminated glass therewith

(18) An interlayer film for heat shield laminated glass, is formed by using a resin composition of a mixture of the dispersion of tin-doped indium oxide fine particles of any one of (1) to (13) and a resin, wherein, under the measuring conditions in which the interlayer film having a thickness of 0.76 mm is interposed between clear glass sheets having a thickness of 2.5 mm, electromagnetic wave shield properties at a frequency of 0.1 MHz to 26.5 GHz is 10 dB or less, a haze value is 1.0% or less, a visible light transmittance is 70% or more, a solar radiation transmittance at a wavelength within a range from 300 to 2100 nm is 80% or less of the visible light transmittance, lo and a reflection yellow index is −12 or more.

(19) The interlayer film for laminated glass according to (18), wherein instead of the reflection yellow index being −12 or more or with the reflection yellow index being −12 or more, a reflection value at 0 degrees among reflected light distribution at an incidence angle of 45 degrees measured by a goniophotometric measurement is 25 or less.

(20) The interlayer film for laminated glass according to (18), wherein 20 to 60 parts by weight of the plasticizer for an interlayer film and 0.1 to 3 parts by weight of the tin-doped indium oxide fine particles based on 100 parts by weight of a polyvinyl acetal resin are contained.

(21) The interlayer film for laminated glass according to (20), wherein the polyvinyl acetal resin is a polyvinyl butyral resin,

(22) The interlayer film for laminated glass according to (18), wherein the resin composition obtained by mixing the dispersion of tin-doped indium oxide fine particles with the resin further contains an alkali metal salt and/or an alkali earth metal salt as an adhesion adjustor.

(23) The interlayer film for laminated glass according to (18), wherein the tin-doped indium oxide fine particles have an average particle size of 80 nm or less and are dispersed such that a number of particles having a particle size of 100 nm or more is one per $\mu m^2$ or less.

(24) A laminated glass includes the interlayer film for laminated glass of any one of (18) to (23)

(25) The laminated glass according to (24) wherein the laminated glass has heat ray shield properties in which electromagnetic wave shield performance at a frequency of 0.1 MHz to 26.5 GHz is 10 dB or less, a haze value is 1.0% or less, a visible light transmittance is 70% or more, a solar radiation transmittance at a wavelength within a range from 300 to 2100 nm is 80% or less of the visible light transmittance, and a reflection yellow index is −12 or more.

(26) The laminated glass according to (25), wherein instead the reflection yellow index being −12 or more, or with the reflection yellow index being −12 or more, a reflection value at 0 degrees among reflected light distribution at an incidence angle of 45 degrees measured by a goniophotometric measurement is 25 or less.

The present invention will now be described in detail.

The dispersion of tin-doped indium oxide fine particles of the present invention is a dispersion of tin-doped indium oxide fine particles (hereinafter also referred to as a dispersion of ITO fine particles) including tin-doped indium oxide fine particles, a plasticizer for an interlayer film, an organic solvent containing alcohols as a main component (hereinafter also referred to as an alcohol solvent), and a dispersion stabilizer, wherein under measuring conditions of the concentration of tin-doped indium oxide fine particles is 0.7% by weight and an optical path length of a glass cell of 1 mm, a visible light transmittance is 80% or more, a solar radiation transmittance at a wavelength within a range from 300 to 2100 nm is ¾ or less of the visible light transmittance, a haze value is 1.0% or less, and a reflection yellow index is −20 or more.

In the dispersion of ITO fine particles of the present invention, instead of the reflection yellow index being −20 or more, or with the reflection yellow index being −20 or more, a reflection value at 0 degrees among reflected light distribution at an incidence angle of 45 degrees measured by a goniophotometric measurement is 30 or less.

The ITO fine particles preferably have a primary average particle size of 0.2 μm or less. In the case in which the primary average particle size is more than 0.2 μm, the haze value of the resulting interlayer film, in its turn, the haze value of the laminated glass becomes worse, or clouding may be caused by scattering of visible light due to ITO fine particles. The primary average particle size is more preferably 0.1 μm or less, and still more preferably 0.08 μm or less. In the ITO fine particles, a lattice constant of its crystal is preferably in a range from 10.11 to 10.16 Å. In the case in which the lattice constant is not within the above range, sufficient heat ray shield effect may not be exerted.

The method for manufacturing the ITO fine particles is not specifically limited. For example, there can be exemplified a method for manufacturing ITO fine particles, which includes reacting an aqueous solution containing a water-soluble salt of indium chloride and a small amount of tin chloride with an alkali, thereby coprecipitating a hydroxide of indium and tin, and annealing the coprecipitate as a material with heating in nitrogen free of oxygen to convert the coprecipitate into an oxide.

In the dispersion of ITO fine particles of the present invention, the plasticizer for an interlayer film functions as a dispersion medium for dispersing the ITO fine particles. This plasticizer for an interlayer film is not specifically limited as long as it is conventionally used for a polyvinyl acetal resin, and a known plasticizer which is generally used as a plasticizer for an interlayer film can be used. For example, there can be used organic ester-based plasticizers such as monobasic acid ester and polybasic acid ester; and phosphoric acid-based plasticizers such as organic phosphoric acid-based and organic phosphorous acid-based plasticizers.

Among the above organic ester-based plasticizers, the monobasic acid ester includes, for example, glycol-based esters obtained by reacting triethylene glycol with organic acids such as butyric acid, isobutyric acid, caproic acid, 2-ethylbutyric acid, heptanoic acid, n-octylic acid, 2-ethylhexylic acid, pelargonic acid (n-nonylic acid), and decylic acid; and esters of tetraethylene glycol or tripropylene glycol with the above organic acids. The polybasic acid ester includes, for example, esters of organic acids such as adipic acid, sebacic acid, and azelaic acid with a linear or branched alcohol having 4 to 8 carbon atoms.

Specific examples of the organic ester-based plasticizer include triethylene glycol di-2-ethyl butyrate, triethylene glycol di-2-ethyl hexoate, triethylene glycol dicapriate, triethylene glycol di-n-octoate, triethylene glycol di-n-heptoate, tetraethylene glycol di-n-heptoate, dibutyl sebacate, dioctyl azelate, dibutylcabitol adipate, ethylene glycol di-2-ethyl butyrate, 1,3-propylene glycol di-2-ethyl butyrate, 1,4-propylene glycol di-2-ethyl butyrate, 1,4-butylene glycol di-2-ethyl butyrate, 1,2-butylene glycol di-2-ethylene butyrate, diethylene glycol di-2-ethyl butyrate, diethylene glycol di-2-ethyl hexoate, dipropylene glycol di-2-ethyl butyrate, triethylene glycol di-2-ethyl pentoate, tetraethylene glycol di-2-ethyl butyrate, and diethylene glycol dicapriate.

Examples of the phosphoric acid-based plasticizer lo include tributoxyethyl phosphate, isodecylphenyl phosphate, and triisopropyl phosphite.

Among these plasticizers for interlayer film, at least one selected from the group consisting of dihexyl adipate (DHA), triethylene glycol di-2-ethylhexanoate (3GO), tetraethylene glycol di-2-ethylhexanoate (4GO), triethylene glycol di-2-ethyl butyrate (3GH), tetraethylene glycol di-2-ethyl butyrate (4GH), tetraethylene glycol di-heptanoate (4G7), and triethylene glycol di-heptanoate (3G7) is preferable because the addition of a metal salt of a carboxylic acid having 5 to 6 carbon atoms, as an adhesion adjustor, makes it possible to prevent deterioration of adhesion between the interlayer film and the glass and to reconcile prevention of whitening and prevention of deterioration of adhesion over time. Among these plasticizers, triethylene glycol di-2-ethylhexanoate (3GO), triethylene glycol di-2-ethyl butyrate (3GH), tetraethylene glycol di-2-ethylhexanoate (4GO), and dihexyl adipate (DHA) are particularly preferable because hydrolysis is less likely to occur.

In the present invention, an organic solvent containing alcohols as a main component is used. The alcohols are not specifically limited. For example, at least one selected from the group consisting of methanol, ethanol, propanol, isopropanol, n-butanol, isobutanol, sec-butanol, tert-butanol, lauryl alcohol, diacetone alcohol, cyclohexanol, ethylene glycol, diethylene glycol, and triethylene glycol is preferable. In the case in which the organic solvent containing alcohols as a main component (i.e., alcohol solvent) contains a small amount of components other than alcohols, methyl ethyl ketone, isopropyl acetate, ethyl lactate, 2-pyrrolidone, and ethyl acetoacetate can be used as the component.

Since the organic solvent containing alcohols as a main component is excellent in affinity with ITO fine particles and is also excellent in compatibility with the plasticizer for an interlayer film, the reflection value measured by a goniophotometric measurement can be reduced to 30 or less, and preferably 25 or less. Here, the reflection value measured by a goniophotometric measurement is a value obtained by subtracting a reference value which is a measured value of a plasticizer filled in a glass cell having an optical path length 1 mm with, from a raw data of a dispersion of ITO fine particles measured at 0 degrees among reflected light distribution at an incidence angle of 45 degrees. Furthermore, a reflection yellow index having a correlation with the measured reflection value can be increased to −20 or more. Also, effect of preventing solvent shock is exerted. Furthermore, effect of suppressing a variation in a dispersion property caused by the kind of the plasticizer for an interlayer film is exerted.

The dispersion stabilizer is preferably a compound containing at least one atom selected from the group consisting of nitrogen, phosphorus, and chalcogen atoms. These atoms are excellent in affinity with ITO fine particles and good dispersion effect can be exerted. Examples of the compound include (I) anionic surfactants such as carboxylic acid salt, sulfonic acid salt, sulfate ester salt, phosphate ester salt, polymerization type polymer, and polycondensation type polymer; (II) nonionic surfactants such as ether, ester, ester ether, and nitrogen-containing one; (III) cationic surfactants such as primary amine salt or tertiary amine salt, quaternary ammonium salt and polyethylenepolyamine derivative; and (IV) amphoteric surfactants such as carboxybetaine, aminocarboxylic acid salt, sulfobetaine, aminosulfate ester, and imidazoline. Among these compounds, at least one selected from sulfate ester-based compound, phosphate ester-based compound, ricinoleic acid, polyricinoleic acid, polycarboxylic acid, polyhydric alcohol type surfactant, polyvinyl alcohol, and polyvinyl butyral is particularly preferable.

Examples of the phosphate ester-based compound include polyoxyethylene alkyl ether phosphoric acid ester, alkyl ether phosphoric acid ester, and polyoxyethylene alkyl phenyl ether phosphoric acid ester.

The dispersion stabilizer is preferably at least one selected from the group consisting of chelate, inorganic acid, and organic acid. The chelate is not specifically limited, and for example, ethylenediaminetetraacetic acids (EDTA) and β-diketones can be used. Among these chelates, β-diketones are preferable because of excellent compatibility with the plasticizer for an interlayer film and the resin, and acetylacetone is particularly preferable. As the β-diketones, for example, benzoyltrifluoroacetone and dipivaloylmethane may also be used. These chelates prevent agglomeration of ITO fine particles and reduce the reflection value measured by a goniophotometric measurement, and also can enhance the reflection yellow index having a correlation with the measured reflection value.

The inorganic acid is not specifically limited. For example, hydrochloric acid and nitric acid can be used. Also, the organic acid is not specifically limited. For example, aliphatic carboxylic acid, aliphatic dicarboxylic acid, aromatic carboxylic acid, and aromatic dicarboxylic acid can be used. Specific examples thereof include benzoic acid, phthalic acid, and salicylic acid. Among these, a C2-C18 aliphatic carboxylic acid is preferable and a C2-C10 aliphatic carboxylic acid is more preferable. Examples of the C2-C10 aliphatic carboxylic acid include acetic acid, propionic acid, n-butyric acid, 2-ethylbutyric acid, n-hexanoic acid, 2-ethylhexanoic acid, and n-octanoic acid. These inorganic and organic acids prevent agglomeration of ITO fine particles and reduce the reflection value measured by a goniophotometric measurement, also can enhance the reflection yellow index having a correlation with the measured reflection value.

In the dispersion of ITO particles of the present invention, in order to exhibit initial optical performances by high dispersion of ITO fine particles, a combination of the plasticizer for an interlayer film, which serves as a dispersion medium, and a dispersion stabilizer is very important. For example, in the case of using triethylene glycol di-2-ethylhexanoate (3GO) as the plasticizer for an interlayer film, when alcohols are used as the solvent and three components of the above phosphate ester-based compound, the organic acid such as 2-ethylhexanoic acid, and the chelate such as acetylacetone are used in combination as the dispersion stabilizer, ITO fine particles can be dispersed with high concentration and high dispersibility and the reflection value measured by a goniophotometric measurement can be reduced, and also the reflection yellow index having a correlation with the measured reflection value can be enhanced. Furthermore, solvent shock can be prevented in the case of diluting with the plasticizer for an interlayer film. In this case, alcohols are preferably methanol, ethanol, isopropanol and diacetone alcohol.

There have been known compositions obtained by adding 3GO as the plasticizer to a solution containing ITO fine particles dispersed in polyphosphate ester and acetylacetone and a composition obtained by further mixing the composition with 2-ethylhexanoic acid. However, these compositions have a drawback in that they are free of alcohols and have high hydrophobicity, and thus ITO fine particles are inferior in affinity with the solution and solvent shock may arise. Also, the dispersion propriety drastically vary depending on the kind of the plasticizer for an interlayer film and it is hard to control the dispersion propriety.

The dispersion system, in which three components of the above phosphate ester-based compound, the organic acid such as 2-ethylhexanoic acid, and the chelate such as acetylacetone are used in combination, also has excellent effect of easily controlling the degree of adhesion at the interface between the interlayer film and the glass. In the laminated glass, in the case in which the degree of adhesion at the interface between the interlayer film and the glass is too low, exfoliation occurs at the interface between the glass and the interlayer film. On the other hand, in the case in which the degree of adhesion is too high, penetration resistance of the laminated glass is lowered. Therefore, an advantage of easily controlling the degree of adhesion at the interface between the interlayer film and the glass is very useful. Also, there is an advantage that a variation in the degree of adhesion at the interface between the glass and the interlayer film caused by a change in moisture of the interlayer film is easily suppressed.

The dispersion stabilizer, other than the chelate, the organic acid, and the inorganic acid, functions as a surfactant for enhancing an interaction between an organic interface and an inorganic interface, and therefore enhances the degree of adhesion at the interface between the interlayer film and the glass. As a result, it is hard to properly control the degree of adhesion between the glass and the interlayer film only by an adhesion adjustor such as an alkali metal salt and/or an alkali earth metal salt, and it is particularly hard to control the degree of adhesion to be a low value. However, when the above three components are used in combination, it is believed that these components cordinate to the adhesion adjustor such as the alkali metal salt and/or the alkali earth metal salt which is for controlling the degree of adhesion at the interface between the interlayer film and the glass, thereby controllability of the adhesion adjustor is enhanced. As a result, as described above, the degree of adhesion can be controlled even under the conditions in which the degree of adhesion at the interface between the glass and the interlayer film is increased by the dispersion stabilizer.

In the dispersion of ITO fine particles of the present invention, when measured under the conditions in which the concentration of ITO fine particles is 0.7% by weight, and a glass cell having an optical path length of 1 mm is used, a visible light transmittance is 80% or more, a solar radiation transmittance at a wavelength within a range from 300 to 2100 nm is ¾ or less of the visible light transmittance, a haze value is 1.0% or less, and a reflection yellow index is −20 or more. Alternatively, the reflection value measured by a goniophotometric measurement under the above measuring conditions is 30 or less.

Among these, each of the haze value, the reflection yellow index, and the reflection value measured by a goniophotometric measurement reflects the dispersion state of ITO fine particles in the dispersion of ITO fine particles. The relation between the visible light transmittance and the solar radiation transmittance reflects heat shield properties of the ITO fine particles themselves. The visible light transmittance and the solar radiation transmittance can be measured by the method defined in Japanese Industrial Standard (JIS R 3106). The haze value can be measured by the method defined in Japanese Industrial Standard (JIS K 7105).

In the dispersion of ITO fine particles of the present invention, in the case in which the visible light transmittance is less than 80%, the resulting interlayer film, in its turn, the laminated glass may have low visible light transmittance. In the case in which the solar radiation transmittance at a wavelength within a range from 300 to 2100 nm is more than ¾ of the visible light transmittance, the resulting interlayer film, in its turn, the laminated glass may be inferior in heat shield properties.

In the dispersion of ITO fine particles of the present invention, the reflection yellow index is −20 or more. The reflection yellow index can be calculated by the following equation defined in Japanese Industrial Standard (JIS K 7103). In the equation, X, Y and Z denote tristimus values due to the measurement of reflection of test samples in standard illuminant C.

Reflection yellow index=100(1.28X−1.06Z)/Y

As a result of secondary agglomeration of ITO fine particles, scattering of visible light in a short wavelength range occurs and clouding of the dispersion system is induced under a light source. The reason is believed to be as follows: when the ITO fine particles causes secondary agglomeration, the particle size increases, thereby causing scattering of visible light in a short wavelength range. In proportion to a large number of agglomerates, the reflectance of visible light in a short wavelength range becomes higher and clouding increases. Here, it is believed that the reflectance (Z) of visible light in a short wavelength range of the dispersion of ITO fine particles and the interlayer film containing ITO fine particles is proportional to clouding of the ITO fine particles in the dispersion system. That is, it is believed that the reflectance (Z) of visible light in a short wavelength range is proportional to the degree of secondary agglomeration of the ITO fine particles, and in the case in which the dispersibility is poor, the reflectance (Z) of visible light in a short wavelength range becomes higher. In the case of the same ITO concentration, absorption of visible light in a medium wavelength range is almost the same as that of visible light in a long wavelength range, and thus X and Y are almost the same. Therefore, in the case of the same ITO concentration, as the reflectance (Z) of visible light in a short wavelength range becomes higher, the value of the reflection yellow index decreases and clouding increases. Therefore, the use of the reflection yellow index (YI) as an indicator makes it possible to grasp dispersibility of the ITO fine particles and to grasp transparency of the dispersion of ITO fine particles and the interlayer film containing ITO fine particles. In the case of ITO fine particles having different concentrations, since the values of X and Y change and the level of the reflection yellow index increases, a relative comparison cannot be made simply.

In the case in which the haze value of the dispersion of ITO fine particles is more than 1.0% or the reflection yellow index is less than −20, the ITO fine particles are not sufficiently dispersed and the resulting interlayer film, in its turn, the laminated glass has poor haze value and poor reflection yellow index. In the case in which the reflection value measured by a goniophotometric measurement is more than 30, clouding occurs at a certain angle, resulting in poor transparency.

In the dispersion of ITO fine particles of the present invention, as long as the visible light transmittance (Tv), the solar radiation transmittance (Ts), the haze value, the reflection yellow index, and the reflectance as determined by a goniophotometer are within the above range, the concentration of the ITO fine particles is not specifically limited. The dispersion may contain a plasticizer for an interlayer film, an organic solvent containing alcohols as a main component and a dispersion stabilizer, and each content is not specifically limited.

The lower limit of the concentration of ITO fine particles is preferably 0.1% by weight and the upper limit is preferably 95.0% by weight. In the case in which the concentration of the ITO fine particles is not within the above range, it may become difficult to uniformly disperse the ITO fine particles.

The lower limit of the concentration of ITO fine particles is more preferably 10% by weight and the upper limit is more preferably 60% by weight.

The content of the plasticizer for an interlayer film is preferably from about 1 to 99.9% by weight, the content of the organic solvent containing alcohols as a main component is preferably from about 0.02 to 25% by weight, and the content of the dispersion stabilizer is preferably from about 0.0025 to 30% by weight. The concentration of the ITO fine particles is more preferably from about 10 to 60% by weight, the content of the plasticizer for an interlayer film is more preferably from about 10 to 85% by weight, the content of the organic solvent containing alcohols as a main component is more preferably from about 0.5 to 10% by weight, and the content of the dispersion stabilizer is more preferably from about 0.02 to 20% by weight.

In the dispersion of ITO fine particles of the present invention, when the dispersion of ITO fine particles having an ITO fine particles of 10.0 to 95.0% by weight is allowed to stand for a long period, or diluted with the plasticizer for an interlayer film so as to adjust the concentration of the ITO fine particles to 40.0% by weight, the mean volume particle size of the ITO fine particles is preferably 80 nm or less and the particle size at 90% accumulation (D90) is preferably 160 nm or less. In the case in which the mean volume particle size is more than 80 nm or D90 is more than 160 nm, when mixing with the resin to manufacture an interlayer film, the average particle of the ITO fine particles in the interlayer film may increase, resulting in poor transparency. In the dispersion of ITO fine particles of the present invention, even when the concentration of the ITO fine particles is decreased to 10.0% by weight by dilution, the mean volume particle size of the ITO fine particles is more preferably 80 nm or less and D90 is more preferably 160 nm or less. Even if the dispersion of ITO fine particles is partially or entirely solidified, fluidity is recovered by vigorous stirring or shaking, and the mean volume particle size becomes 80 nm or less and the particle size at 90% accumulation (D90) becomes 160 nm or less.

The method for manufacturing the dispersion of ITO fine particles of the present invention is not specifically limited, but is preferably a method for mixing the organic solvent containing alcohol as a main component (i.e. alcohol solvent), the dispersion stabilizer, the ITO fine particles, and the plasticizer for an interlayer film, and dispersing the ITO fine particles. The present invention includes this method for manufacturing the dispersion of ITO fine particles.

In the method for manufacturing the dispersion of ITO fine particles of the present invention, as a specific aspect of mixing the alcohol solvent, the dispersion stabilizer, the ITO fine particles, and the plasticizer for an interlayer film, these components may be simultaneously mixed, or a mixed solution containing the alcohol solvent, the dispersion stabilizer, and the tin-doped indium oxide fine particles may be previously prepared and the mixed solution may be added to the plasticizer for an interlayer film, thereby dispersing the tin-doped indium oxide fine particles in the plasticizer for an interlayer film, or the tin-doped indium oxide fine particles may be dispersed in the plasticizer for an interlayer film by adding the plasticizer for an interlayer film to the mixed solution. As the plasticizer for an interlayer film, a plasticizer containing an alcohol solvent and/or a dispersion stabilizer may be used. The composition ratio of the dispersion may be adjusted by evaporation until the concentration of the organic solvent containing alcohols as a main component reaches a predetermined concentration.

In the dispersion of ITO fine particles of the present invention, a mixed solution containing a high concentration of ITO fine particles dispersed therein may be previously prepared and the mixed solution may be diluted with the plasticizer for an interlayer film, or a plasticizer for an interlayer film containing the alcohol solvent and the dispersion stabilizer until the concentration of the ITO fine particles reach a predetermined concentration. In the dispersion of ITO fine particles of the present invention, such a dilution process makes it possible to obtain a dispersion of ITO fine particles free of solvent shock, wherein the mean volume particle size of ITO fine particles is 80 nm or less, and the particle size at 90% accumulation (D90) is 160 nm or less, by appropriately selecting the plasticizer for an interlayer film, the alcohol solvent, and the dispersion stabilizer.

In the method for manufacturing the dispersion of ITO fine particles of the present invention, an apparatus used for mixing and dispersion is not specifically limited. For example, extruder, plastograph, ball mill, beads mill, sand grinder, kneader, Banbury mixer, and calendering roll can be used.

By using a resin composition obtained by mixing the dispersion of ITO fine particles of the present invention with the resin, an interlayer film for laminated glass with heat ray shield properties can be manufactured. This laminated glass can have excellent optical characteristics and excellent heat shield properties because the ITO fine particles are highly dispersed.

In the interlayer film, the ITO fine particles are preferably dispersed such that the average particle size is 80 nm or less. In the case in which the average particle size is more than 80 nm, severe scattering of visible light due to the ITO fine particles occurs and the resulting interlayer film may be inferior in transparency. As a result, the haze value becomes worse when the laminated glass is assembled and thus it becomes impossible to obtain high transparency required to a front glass of automobiles.

In the interlayer film, the ITO fine particles are preferably dispersed such that the number of particles having a particle size of 100 nm or more is one per $\mu m^2$ or less. That is, the ITO fine particles are commonly dispersed such that, when a heat ray shield interlayer film for laminated glass is photographed and observed by a transmission electron microscope, ITO fine particles having a particle size of 100 μm or more are not found or, if any, the number of ITO fine particles having a particle size of 100 μm or more is only one per $\mu m^2$. When a laminated glass is manufactured by using the interlayer film in such a dispersion state, the resulting laminated glass has low haze value and is excellent in transparency and heat shield properties. The observation is conducted using a transmission electron microscope (Model H-7100FA, manufactured by Hitachi, Ltd.) at an acceleration voltage of 100 kV.

The resin to be mixed with the dispersion of ITO fine particles of the present invention is not specifically limited. For example, it may be a known resin which is generally used as a transparent resin of the interlayer film for laminated glass. Specific examples of the resin include polyvinyl acetal resin, polyurethane resin, ethylene-vinyl acetate resin, acrylic copolymer resin including, as a constituent unit, acrylic acid or methacrylic acid, or derivatives thereof, and vinyl chloride-ethylene-glycidyl methacrylate copolymer resin. Among these resins, polyvinyl acetal resin is preferable. These resins can be easily manufactured by a known method or a method analogous to the known method.

The polyvinyl acetal resin is not specifically limited as long as it is a polyvinyl acetal resin obtained by acetalizing polyvinyl alcohol with aldehyde, and is particularly preferably polyvinyl butyral. The polyvinyl alcohol is usually obtained by saponifying vinyl polyacetate, and polyvinyl alcohol having a saponification degree of 80 to 99.8 mol % is generally used.

A molecular weight and a molecular weight distribution of the polyvinyl acetal resin are not specifically limited. In view of formability and physical properties, the lower limit of the polymerization degree of the polyvinyl alcohol resin as a material is preferably 200 and the upper limit is preferably 3000. In the case in which the polymerization degree is less than 200, the resulting laminated glass may be inferior in penetration resistance. On the other hand, in the case in which the polymerization degree is more than 3000, the resin film is inferior in formability and also the resin film has too high rigidity, resulting in poor processability. The lower limit of the polymerization degree is more preferably 500 and the upper limit is more preferably 2000.

Also, the aldehyde used for acetalization is not specifically limited. In general, aldehyde having 1 to 10 carbon atoms is used. Examples thereof include n-butylaldehyde, isobutylaldehyde, n-valeraldehyde, 2-ethylbutylaldehyde, n-hexylaldehyde, n-octylaldehyde, n-nonylaldehyde, n-decylaldehyde, formaldehyde, acetaldehyde and benzaldehyde. Among these aldehydes, n-butylaldehyde, n-hexylaldehyde, and n-valeraldehyde are preferable, and butylaldehyde having 4 carbon atoms is particularly preferable.

The polyvinyl acetal is preferably polyvinyl butyral acetalized by butylaldehyde. Taking account of required physical properties, these acetal resins may be appropriately blended in combination. Furthermore, a copolyvinyl acetal resin may be appropriately used in combination with aldehyde on acetalization. The lower limit of the acetalization degree of the polyvinyl acetal resin used in the present invention is preferably 40% and the upper limit is preferably 85%. The lower limit is more preferably 60% and the upper limit is more preferably 75%.

When a polyvinyl acetal resin is used as the resin, the resin composition preferably contains 20 to 60 parts by weight of a plasticizer for an interlayer film and 0.1 to 3 parts by weight of ITO fine-particles based on 100 parts by weight of the polyvinyl acetal resin. In the case in which the amount of the plasticizer for an interlayer film is less than 20 parts by weight, penetration resistance may be lowered. On the other hand, in the case in which the amount is more than 60 parts by weight, bleed-out of the plasticizer occurs and transparency or adhesion of the heat ray shield interlayer film for laminated glass is lowered, and thus the resulting laminated glass may have large optical strain. The lower limit of the amount of the plasticizer for an interlayer film is more preferably 30 parts by weight and the upper limit is more preferably 60 parts by weight. In the case in which the amount of the ITO fine particles is less than 0.1 parts by weight, sufficient heat ray shield effect may not be exerted. On the other hand, in the case in which the amount is more than 3.0 parts by weight, visible light transmittance may be lowered and the haze value may increase.

Preferably, the resin composition further contains an adhesion adjustor. The adhesion adjustor is not specifically limited, and an alkali metal salt and/or an alkali earth metal salt are preferably used. The alkali metal salt and/or the alkali earth metal salt are not specifically limited and examples thereof include salts of potassium, sodium, and magnesium. The acid constituting the salts is not specifically limited and examples thereof lo include organic acids, for example, carboxylic acids such as octylic acid, hexylic acid, butyric acid, acetic acid, and formic acid; and inorganic acids such as hydrochloric acid and nitric acid.

Among the above alkali metal salt and/or the alkali earth metal salt, an alkali metal salt and an alkali earth metal salt of an organic acid having 2 to 16 carbon atoms are preferable, and a magnesium salt of carboxylic acid having 2 to 16 carbon atoms, and a potassium salt of carboxylic acid having 2 to 16 carbon atoms are preferable.

The magnesium or potassium salt of carboxylic acid having 2 to 16 carbon atoms is not specifically limited, and for example, magnesium acetate, potassium acetate, magnesium propionate, potassium propionate, magnesium 2-ethylbutanoate, potassium 2-ethylbutanoate, magnesium 2-ethylhexanoate and potassium 2-ethylhexanoate are preferably used. These salts may be used alone or in combination.

The amount of the alkali metal salt and/or the alkali earth metal salt is not specifically limited. For example, when the resin is a polyvinyl acetal resin, the lower limit of the amount is preferably 0.001 parts by weight based on 100 parts by weight of the polyvinyl acetal resin, and the upper limit is preferably 1.0 parts by weight. In the case in which the amount is less than 0.001 parts by weight, the degree of adhesion in the vicinity of the heat ray shield interlayer film for laminated glass may be lowered under a high humidity atmosphere. In the case in which the amount is more than 1.0 parts by weight, the degree of adhesion may be excessively lowered and transparency of the heat ray shield interlayer film for laminated glass may be lost. The lower limit of the amount is more preferably 0.01 parts by weight and the upper limit is more preferably 0.2 parts by weight.

Preferably, the resin composition further contains an antioxidant. The antioxidant is not specifically limited and examples of the phenolic antioxidant include 2,6-Di-tert-butyl-p-cresol (BHT) ("Sumilizer BHT", manufactured by Sumitomo Chemical Industries Co., Ltd.) and tetrakis-[methylene-3-(3'-5'-di-t-butyl-4'-hydroxyphenyl)propionate] methane (Irganox 1010, manufactured by Ciba Geigy Ltd.). These antioxidants may be used alone or in combination. The amount of the antioxidant is not specifically limited. For example, when the resin is a polyvinyl acetal resin, the lower limit of the amount is preferably 0.01 parts by weight based on 100 parts by weight of the polyvinyl acetal resin, and the upper limit is preferably 5.0 parts by weight.

Preferably, the resin composition further contains an ultraviolet absorber. The ultraviolet absorber is not specifically limited and examples thereof include benzotriazole-based compound, benzophenone-based compound, triazine-based compound, and benzoate-based compound.

The benzotriazole-based compound is not specifically limited and examples thereof include 2-(2'-hydroxy-5'-methylphenyl)benzotriazole (Tinuvin P, manufactured by Ciba Geigy Ltd.), 2-(2'-hydroxy-3',5'-di-t-butylphenyl)benzotriazole (Tinuvin 320, manufactured by Ciba Geigy Ltd.), 2-(2'-hydroxy-3'-t-butyl-5'-methylphenyl)-5-chlorobenzotriazole (Tinuvin 326, manufactured by Ciba Geigy Ltd.) and 2-(2'-hydroxy-3',5'-di-amylphenyl)benzotriazole (Tinuvin 328, manufactured by Ciba Geigy Ltd.).

The benzophenone-based compound is not specifically limited, and examples thereof include octabenzone (Chimassorb 81, manufactured by Ciba Geigy Ltd.). The triazine-based compound is not specifically limited and examples thereof include 2-(4,6-diphenyl-1,3,5-triazin-2-yl)-5-[(hexyl)oxy]-phenol (Tinuvin 1577FF, manufactured by Ciba Geigy Ltd.). Furthermore, the benzoate-based compound is not specifically limited and examples thereof include 2,4-di-tert-butylphenyl-3,5-di-tert-butyl-4-hydroxybenzoate (Tinuvin 120, manufactured by Ciba Geigy Ltd.).

The amount of the ultraviolet absorber is not specifically limited. For example, when the resin is a polyvinyl acetal resin, the lower limit of the amount is preferably 0.01 parts by weight based on 100 parts by weight of the polyvinyl acetal resin, and the upper limit is preferably 5.0 parts by weight. In the case in which the lower limit is less than 0.01 parts by weight, the effect of absorbing ultraviolet radiation may be hardly exerted. In the case in which the upper limit is more than 5.0 parts by weight, weatherability of the resin may be deteriorated. The lower limit is more preferably 0.05 parts by weight and the upper limit is more preferably 1.0 parts by weight.

If necessary, the interlayer film for laminated glass including the resin composition may contain additives such as photostabilizers, surfactants, flame retardants, antistatic agents, moisture resistant agents, colorants, heat ray reflecting agents, and heat ray absorbers. Although the entire amount of the dispersion stabilizer contained in the resin composition may be derived from the dispersion of ITO fine particles of the present invention, the dispersion stabilizer may be separately added when the amount is insufficient. In this case, the same dispersion stabilizer as that described above can be used.

The method for manufacturing the interlayer film for laminated glass of the present invention is not specifically limited and includes, for example, a method for mixing the ITO resin dispersion of the present invention with the above resin, and a plasticizer for an interlayer film and/or additives, which are optionally added, such that the final concentration of the ITO fine particles is within an expected range to obtain a resin lo composition, and forming the mixture into a film using a conventional film forming method such as extrusion method, calendering method or pressing method. Among these methods, an extruding method using extruding machine in which two axes are arranged in parallel is preferable and can further enhance the haze value. Using the resulting interlayer film for laminated glass, a laminated glass having excellent heat ray shield properties can be manufactured. The method for manufacturing the laminated glass may be a conventionally known method.

The interlayer film for laminated glass of the present invention is conventionally used in the state of being interposed between laminated glasses. As the glass, for example, high heat ray absorption glass, clear glass, and green glass are used. The high heat ray absorption glass as used herein refers to a heat ray absorption glass wherein the visible light transmittance is 75% or more and the transmittance is 65% or less in an entire wavelength range within a range from 900 to 1300 nm.

The interlayer film and the laminated glass of the present invention has heat ray shield properties, for example, under measuring conditions in which an interlayer film having a thickness of 0.76 mm is interposed between clear glass sheets having a thickness of 2.5 mm, the electromagnetic wave shield properties at a frequency of 0.1 MHz to 26.5 GHz are 10 dB or less, the haze value is 1.0% or less, the visible light transmittance is 70% or more, the solar radiation transmittance at a wavelength within a range from 300 to 2100 nm is 80% or less of the visible light transmittance, and the reflection yellow index is −12 or more, which is preferably −10 or more, and more preferably −8 or more.

The electromagnetic wave shield properties act as an indicator which represents the degree of attenuation when an electromagnetic wave at a measured frequency penetrates through the interlayer film or the laminated glass. In the case in which the electromagnetic wave shield properties are 10 dB or less, when using this laminated glass for the front glass of automobiles, the latest mobile communication equipment can be used in the automobile without causing any problem.

The haze value of the interlayer film or the laminated glass of the present invention is 1.0% or less. In the case in which the haze value is 1.0% or more, transparency of the interlayer film or the laminated glass becomes insufficient for practical use.

In the interlayer film or the laminated glass of the present invention, the visible light transmittance is 70% or more. In the case in which the visible light transmittance is less than 70%, transparency of the interlayer film or the laminated glass becomes insufficient for practical use. Therefore, it becomes impossible to pass the automotive front glass regulation, and thus good visibility is adversely affected.

In the interlayer film or laminated glass of the present invention, the solar radiation transmittance at a wavelength within a range from 300 to 2100 nm is 80% or less of the visible light transmittance. In the case in which the visible light transmittance is more than 80%, transparency of the interlayer film or the laminated glass becomes insufficient for practical use.

In the interlayer film or laminated glass of the present invention, the reflection yellow index is −12 or more, preferably −10 or more, and mote preferably −8 or more. This means that scattering of visible light due to ITO fine particles is less likely to occur, resulting in less clouding. Here, when the concentration and the dispersion state are the same, the reflection yellow index depends on the optical path length of the ITO fine particles dispersion, the dispersion medium, and quality of the glass. The reflection yellow index of the dispersion of ITO fine particles is −20 or more under the measuring conditions due to the above dispersion medium using a glass cell having an optical path length of 1 mm. When the laminated glass was assembled, the optical path length is shorter than that described above and the medium contains the polyvinyl acetal resin. Therefore, the reflection yellow index of the laminated glass is preferably −12 or more.

In the interlayer film or laminated glass of the present invention, the measured reflection value at 0 degrees among reflected light distribution at an incidence angle of 45 degrees measured by a goniophotometric measurement is 25 or less, preferably 20 or less, and more preferably 15 or less. This means that scattering of visible light due to secondary agglomeration of ITO fine particles is less likely to occur, resulting in less clouding. In the case in which the measured reflection value is more than 25, clouding may occur and the transparency of the resulting laminated glass becomes insufficient for practical use. Here, the reflection value measured by a goniophotometric measurement is a value obtained by subtracting a measured reflection value, as a reference, of a laminated glass obtained by interposing an interlayer film containing no ITO fine particles dispersed therein between two clear glass sheets, from a raw data of the interlayer film or the laminated glass measured at 0 degrees among reflected light distribution at an incidence angle of 45 degrees.

BEST MODE FOR CARRYING OUT THE INVENTION

The present invention will now be described in more detail by way of examples. The measurement and evaluation were conducted by the following procedures.

(A) Primary Average Particle Size of ITO Fine Particles

The primary average particle size was calculated from the measured value of the specific surface area (BET) by the following equation. It has been confirmed that the average particle size thus determined from the specific surface area nearly agrees with the particle size determined by directly observing using a transmission electron microscope. The specific surface area due to a BET method was measured by using a Betasorb automatic surface area meter, Model 4200, manufactured by Microtrac Inc.

$$a\ (\mu m) = 6/(\rho \times B)$$

(a: average particle size, $\rho$: true specific gravity, B: specific surface area (m$^2$/g))

(B) Crystal Lattice Constant of ITO Fine Particles

The lattice constant was determined by the following procedure. Using an automatic X-ray diffractometer MO3X equipped with monochromoter, correction was conducted by a high-purity silicon single crystal (99.9999%) and spacing was calculated from a peak attributed to a plane index (hkl), and then the lattice constant was determined by the least-square method.

(C) Tv and Ts of Dispersion of ITO Fine Particles

Using a dispersion of ITO fine particles for evaluation (0.7% by weight) charged in a glass cell having an optical path length of 1 mm, the transmittance at a wavelength within a range from 300 to 2100 nm was measured by an autographic spectrophotometer (U-4000, manufactured by Hitachi, Ltd.) and visible light transmittance (Tv) at a wavelength within a range from 380 to 780 nm and a solar radiation transmittance (Ts) at a wavelength within a range from 300 to 2100 nm were determined in accordance with Japanese Industrial Standard (JIS R 3106).

(D) Reflection Yellow Index of Dispersion of ITO Fine Particles

Using the same dispersion, measuring cell and autographic spectrophotometer as those used in (C), the reflectance at a wavelength within a range from 380 to 780 nm was measured and the reflection yellow index was calculated in accordance with Japanese Industrial Standard (JIS K 7103).

(E) Haze Value of Dispersion of ITO Fine Particles

Using the same dispersion and measuring cell as those used in (C), the haze value was measured by a turbidimeter with integrating sphere (manufactured by Tokyo Denshoku Co., Ltd.) in accordance with Japanese Industrial Standard (JIS K 7105).

(F) Goniophotometric Measurement of ITO Fine Particles

Using the same dispersion and measuring cell as those used in (C), reflected light distribution-at an incidence angle of 45 degrees was measured by an automatic goniophotometer (GP-200, manufactured by Murakami Color Research Laboratory) using a halogen lamp as the light source. Light is received at an angle within a range from −90 to 90 degrees and a value was measured at 0 degrees among reflected light distribution. After measuring a laminated glass obtained by interposing an interlayer film containing no ITO fine particles dispersed therein between two clear glass sheets, the value at 0 degrees was determined and the resulting value was taken as a reference. The measurement of the dispersion was conducted in the same manner and the value obtained by subtracting the reference from the measured value was taken as a measured reflection value. The measurement was conducted under the following conditions.

Light source intensity: 12V, 50 W
Type of measurement: measurement of reflection
Light receiver: photomultiplier
Tilt angle of sample: 2.5 degrees
Conditions of light receiver:
SENSITIVITY ADJ: 999
HIGH VOLT ADJ: 999

(G) Particle Size of ITO Fine Particles in Dispersion of ITO Fine Particles

Using a microtrac UPA particle size analyzer manufactured by NIKKISO Co., Ltd., particle size distribution of ITO fine particles in a dispersion of ITO fine particles having a concentration of ITO fine particles of 10% by weight was determined.

(H) Tv and Ts of Laminated Glass

Using an autographic spectrophotometer (U-4000, manufactured by Hitachi, Ltd.), the transmittance at a wavelength within a range from 300 to 2100 nm of the laminated glass was measured and then the visible light transmittance (Tv) at a wavelength within a range from 380 to 780 nm and the solar radiation transmittance (Ts) at a wavelength within a range from 300 to 2100 nm were measured in accordance with Japanese Industrial Standard (JIS R 3106 "Testing method on transmittance, reflectance, and emittance of flat glasses, and evaluation of solar heat gain coefficient").

(I) Reflection Yellow Index of Laminated Glass

Using an autographic spectrophotometer (U-4000, manufactured by Hitachi, Ltd.), the reflectance at a wavelength within a range from 380 to 780 nm was measured and then the reflection yellow index was calculated in accordance with Japanese Industrial Standard (JIS K 7103).

(J) Haze Value of Laminated Glass

Using a turbidimeter with integrating sphere (manufactured by Tokyo Denshoku Co., Ltd.), the haze value of the laminated glass was measured in accordance with Japanese Industrial Standard (JIS K7105).

(K) Electromagentic Wave Shield Properties ($\Delta$dB) of Laminated Glass

In accordance with the KEC method (method for testing the electromagnetic wave shield effect in a near field), the reflection loss (dB) for electromagnetic wave within the range of 0.1 to 10 MHz of the laminated glass and that of a common float sheet glass with the thickness of 2.5 mm were measured respectively and were compared, and the minimum and maximum differences between their reflection loss (dB) were described. With respect to the reflection loss (dB) for electromagnetic wave within the range of 2 to 26.5 GHz, after standing a 600 mm-square sample between a pair of transreceiver antennas, radio waves from a radio signal generating apparatus were received by a spectrum analyzer and electromagentic wave shield properties of the sample were evaluated (method for testing the electromagnetic wave in a remote field).

(L) Goniophotometric Measurement of Interlayer Film and Laminated Glass

Using an automatic goniophotometer (GP-200, manufactured by Murakami Color Research Laboratory) and using a halogen lamp as the light source, reflected light distribution at an incidence angle of 45 degrees was determined. Light is received at an angle within a range from −90 to 90 degrees and a value was measured at 0 degrees among reflected light distribution. After measuring a laminated glass obtained by interposing an interlayer film containing no ITO fine particles dispersed therein between two clear glass sheets, the value at 0 degrees was determined and the resulting value was taken as a reference. The measurement of the laminated glass for evaluation was conducted and the value obtained by subtracting the reference from the measured value was taken as a measured reflection value. The measurement was conducted under the following conditions.

Light source intensity: 12V, 50 W
Type of measurement: measurement of reflection
Light receiver: photomultiplier
Tilt angle of sample: 2.5 degree
Conditions of light receiver:
SENSITIVITY ADJ: 999
HIGH VOLT ADJ: 999

(M) Dispersion State of ITO Fine Particles in Interlayer Film

After preparing ultra-flake of the interlayer film by using a microtome, the distribution of ITO fine particles were photographed and observed under the following conditions by using a transmission election microscope (TEM, Model H-7100FA, manufactured by Hitachi, Ltd.). The photographing was carried out in the range of 3 μm×4 μm at 20,000 magnifications and enlarged at the time of printing. Obtained image was subjected to a visual observation, particle sizes of all ITO fine particles in the above observed scope are measured, and the average particle size was calculated as an mean volume particle size. Here, the particle size of ITO fine particle was decided to be the longest one of the ITO fine particle. Also, counting the number of the fine particles having a particle size of 100 nm or more within the above-mentioned observed scope, dividing them by 12 μm² of an observed space to calculate the number of the particles per μm².

(N) Adhesion of Interlayer Film

The adhesion of the interlayer film to the glass was evaluated in terms of a pummel value. It is to be understood that the larger the pummel value, the higher the degree of adhesion to the glass, while the smaller the pummel value, the lower the degree of adhesion to the glass. The test method is as follows. First, the laminate glass was allowed to stand at a temperature of −18±0.6° C. for 16 hours and then crushed with a hammer having a head weighing 0.45 kg until the glass fragments became 6 mm or less in diameter. The degree of exposure of the film after partial exfoliation of glass was estimated by comparison with graded limit samples and the result was expressed in the pummel value according to the schedule shown below in Table 3. The degree of adhesion of the interlayer film to the glass is preferably adjusted such that the pummel value is within a range from 3 to 6.

EXAMPLES

Example 1

(Preparation of Dispersion of ITO Fine Particles)

10 Parts by weight ITO fine particles (primary average particle size: 20 nm, crystal lattice constant: 10.12 Å), 1 part by weight of a polyoxyethylene alkyl ether phosphoric acid ester compound as the dispersant, 2 parts by weight of 2-ethylhexanoic acid, 3 parts by weight of acetylacetone, 4 parts by weight of ethanol as the organic solvent, and 80 parts by weight of triethylene glycol di-2-hexanoate (3GO) were mixed and dispersed to prepare a dispersion of ITO fine particles. This composition is shown in Table 1. This dispersion of ITO fine particles was diluted with triethylene glycol di-2-hexanoate (3GO) so as to adjust the concentration of the ITO fine particles to 0.7% by weight to obtain a dispersion of ITO fine particles for evaluation. The visible light transmittance (Tv), the solar radiation transmittance (Ts), the haze value, the reflection yellow index, the reflection value measured by a goniophotometric measurement of the dispersion having an ITO concentration of 0.7% by weight are shown in Table 2. With respect to the dispersion having an ITO-concentration of 10% by weight, the mean volume particle size and particle size at 90% accumulation of the ITO fine particles are shown in Table 2 (Sample No. 1a).

34.5 Parts by weight of ITO fine particles, and a polyoxyethylene alkyl ether phosphoric acid ester compound, 2-ethylhexanoic acid, acetylacetone, ethanol, and 3GO, each of which amount is shown in Table 1, were mixed to prepare a dispersion of ITO fine particles and then the dispersion of ITO fine particles was diluted with 3GO to obtain a dispersion having an ITO concentration of 0.7% by weight and a dispersion having an ITO concentration of 10% by weight. In the same manner as in the case of the Sample No. 1a, physical properties of these dispersions were determined. The results are shown in Table 2 (Sample No. 1b).

Furthermore, 25 parts by weight of ITO fine particles, and a polyoxyethylene alkyl ether phosphoric acid ester compound, 2-ethylhexanoic acid, acetylacetone, ethanol, and 3GO each of which amount is shown in Table 1, were mixed to prepare a dispersion of ITO fine particles, and then the dispersion of ITO fine particles was diluted with 3GO to obtain a dispersion having an ITO concentration of 0.7% by weight and a dispersion having an ITO concentration of 10% by weight. In the same manner as in the case of the Sample No. 1a, physical properties of these dispersions were determined. The results are shown in Table 2 (Sample No. 1c).

(Synthesis of Polyvinyl Butyral)

275 g of polyvinyl alcohol having an average polymerization degree of 1700 and a saponification degree of 99.2 mol % was added to 2890 g of pure water and then dissolved with heating. After the temperature of the solution was controlled to 15° C., 201 g of hydrochloric acid having a concentration of 35% by weight and 157 g of n-butylaldehyde were added, and then the mixed solution was maintained at 15° C., thereby precipitating a reaction product. After the reaction was completed by maintaining the reaction system at 60° C. for 3 hours, the reaction mixture was washed with an excess amount of water for washing away unreacted n-butyraldehyde, neutralized with sodium hydroxide, which is the common neutralizing agent, moreover washed with an excessive amount of water for 2 hours and dried to provide polyvinyl butyral resin as a white powder with an average butyralization degree of 68.5 mol %.

(Production of Heat Ray Shield Interlayer Film for Laminated Glass)

To 100 parts by weight of a polyvinyl butyral resin, 2.8 parts by weight of a dispersion of ITO fine particles (ITO concentration: 10% by weight, Sample No. 1a) shown in Table 1 was added, and 3GO was added so as to adjust the ITO concentration to 0.2% by weight. Then magnesium 2-ethylbutyrate and magnesium acetate were added appropriately to be 60 ppm as magnesium content to the reaction mixture. The mixture was melt-kneaded thoroughly with a mixing roll and press-molded with a press-molding machine at 150° C. for 30 minutes to provide an interlayer film for laminated glass having an average thickness of 0.76 mm.

(Production of Laminated Glass)

The resulting interlayer film was interposed between two transparent float sheet glasses (30 cm×30 cm×2.5 mm thickness) and the assembly was placed in a rubber bag and deaerated under a vacuum of 2660 Pa for 20 minutes. The deaerated assembly was transferred to an oven under suction and pressed under vacuum at 90° C. for 30 minutes. The prebonded laminated glass thus obtained was subjected to post-bonding in an autoclave at 135° C. and 118N/cm² for 20 minutes to provide a laminated glass. Physical properties of the laminated glass were determined. The results are shown in Table 2 (Sample No. 1a).

An dispersion of ITO fine particles (ITO concentration: 34.5% by weight, Sample No. 1b) shown in Table 1 was mixed with polyvinyl butyral resin and then magnesium was added in the same amount as that in the case of the Sample No. 1a to prepare interlayer films (thickness: 0.76 mm) wherein the concentration of the ITO fine particles is 0.7% by weight and 0.2% by weight. Using the resulting interlayer films, a laminated glass was manufactured in the same manner as in the case of the Sample No. 1a. Physical properties of the laminated glass were determined. The results are shown in Table 2 (Sample No. 1b).

Example 2

In the same manner as in Example 1, except that ITO fine particles having a primary particle size and a lattice constant shown in Table 1 were used and three kinds of dispersion stabilizers and alcohols were used, and also the respective components were used in the amounts shown in Table 1, a dispersion of ITO fine particles was prepared. The components of this dispersion are shown in Table 1. An interlayer film was manufactured by diluting the dispersion with a plasticizer for an interlayer film shown in Table 1 so as to adjust to the ITO concentration to the value shown in Table 2, and then a laminated glass was manufactured by using the interlayer film. Physical properties of the dispersion of ITO fine particles and the laminated glass were determined and evaluated. The results are shown in Table 2 (Samples No. 2 to No. 9).

Example 3

In the same manner as in Example 1, except that a compound shown in Table 1 was used as the plasticizer for an interlayer film and the respective components were used in the amounts shown in Table 1, a dispersion of ITO fine particles was prepared. The components of this dispersion are shown in Table 1. An interlayer film was manufactured by diluting the dispersion with a plasticizer for an interlayer film shown in Table 1 so as to adjust to the ITO concentration to the value shown in Table 2, and then a laminated glass was manufactured by using the interlayer film. Physical properties of the dispersion of ITO fine particles and the laminated glass were determined and evaluated. The results are shown in Table 2 (Samples No. 10 to No. 12).

Test Example

Using ITO fine particles, a plasticizer for an interlayer film, a dispersion stabilizer and alcohols shown in Table 1 in the amount shown in Table 1, a dispersion of ITO fine particles was manufactured. An interlayer film was manufactured by diluting the dispersion with a plasticizer for an interlayer film shown in Table 1 so as to adjust to the ITO concentration to the value shown in Table 2, and then a laminated glass was manufactured by using the interlayer film. Physical properties of the dispersion of ITO fine particles and the laminated glass were determined and evaluated. The results are shown in Table 2 (Samples No. 13 to No. 14).

Comparative Example

Using ITO fine particles having a slightly large lattice constant and using a plasticizer for an interlayer film, a dispersion stabilizer, and alcohols shown in Table 1 in the amount shown in Table 1, a dispersion of ITO fine particles was manufactured. Using ITO fine particles, a plasticizer for an interlayer film, a dispersion stabilizer, and alcohols shown in Table 1 in the amount shown in Table 1, a dispersion of ITO fine particles was manufactured. A laminated glass was manufactured by using these dispersions. Physical properties of the dispersion of ITO fine particles and the laminated glass were determined and evaluated. The results are shown in Table 2 (Samples No. 15 to No. 18).

In the same manner as in Example 1, except that a dispersion stabilizer and alcohols were not used and only a plasticizer for an interlayer film was used, a dispersion of ITO fine particles was prepared. The components of this dispersion are shown in Table 1. A laminated glass was manufactured using the dispersion. Physical properties of the dispersion of ITO fine particles and the laminated glass were determined and evaluated. The results are shown in Table 2 (Sample No. 19).

In the same manner as in Example 1, except that alcohols were not used and one kind of sulfate ester or n-butyric acid was used as the dispersion stabilizer, a dispersion of ITO fine particles was prepared. The components of this dispersion are shown in Table 1. A laminated glass was manufactured using the dispersion. Physical properties of the dispersion of ITO fine particles and the laminated glass were determined. The results are shown in Table 2 (Samples No. 20 to No. 21).

In the same manner as in Example 1, except for using the components of the Samples No. 1a, No. 2, and No. 12 shown in Table 1, excluding alcohols, a dispersion of ITO fine particles was prepared. A laminated glass was manufactured using the dispersion. Physical properties of the dispersion of ITO fine particles and the laminated glass were determined. The results are shown in Table 2 (Samples No. 22, No. 23, and No. 24).

In the same manner as in Example 1, except that a dispersion stabilizer was not used and a plasticizer and alcohols were used, a dispersion of ITO fine particles was prepared. The components of this dispersion are shown in Table 1. A laminated glass was manufactured using the dispersion. Physical properties of the dispersion of ITO fine particles and the laminated glass were determined. The results are shown in Table 2 (Sample No. 25).

In the same manner as in Example 1, except that the same ITO fine particles and plasticizer for an interlayer film as those in Example 1 and also an anionic surfactant or a higher fatty acid ester was used as shown in Table 1, a dispersion of ITO fine particles was prepared. The components of this dispersion are shown in Table 1. A laminated glass was manufactured using the dispersion. Physical properties of the dispersion of ITO fine particles and the laminated glass were determined. The results are shown in Table 2 (Samples No. 26 to No. 27).

As shown in Table 1 and Table 2, the dispersion of ITO fine particles and laminated glasses of Examples (No. 1 to No. 12) of the present invention show high visible light transmittance (Tv), low haze value, and high absolute value of the reflection yellow index as compared with Comparative Samples (No. 16 to No. 21, No. 25 to No. 27). The laminated glasses of Examples (No. 1 to No. 12) of the present invention show extremely low value measured by a goniophotometric measurement, extremely low mean volume particle size, and extremely low number of particles having a particle size larger than 100 nm as compared with the Comparative Samples (No. 16 to No. 21, No. 25 to No. 27). In all samples, the pummel value was 4 and was controlled within a preferable range.

The Sample No. 13 containing no n-butyric acid as the dispersion stabilizer and the Sample No. 14 containing no acetylacetone as the dispersion stabilizer are excellent in visible light transmittance, solar radiation transmittance, haze value, reflection yellow index, reflection value measured by a goniophotometric measurement, and pummel value.

In the case of the Comparative Sample No. 15 wherein ITO fine particles have a slightly large lattice constant, a ratio of the solar radiation transmittance to the visible light transmittance is not within the range of the present invention. In the case of the Comparative Samples (No. 16 to No. 21, No. 25 to No. 27), the haze value of the dispersion of ITO fine particles is more than 1.0% and the reflection yellow index is considerably less than −20 and also the reflection value measured by a goniophotometric measurement is more than 40. The haze value of the interlayer film for laminated glass is more than 1.0% and the reflection yellow index is within a range from −15 to −18 and also the reflection value measured by a goniophotometric measurement is within a range from 29 to 66, and thus all of them are not within the range of the present invention.

In the case of the Comparative Samples No. 22 to No. 24, the haze value of the dispersion of ITO fine particles is more than 1.0% and the reflection yellow index is less than −20 and also the reflection value measured by a goniophotometric measurement is more than 50. In the case of the Samples No. 22 and No. 23, the haze value of the interlayer film for laminated glass is 1.0% or less, while the haze value is more than 1.0% in the case of the Sample No. 24. The reflection yellow index is within a range from −14 to −18 and the reflection value measured by a goniophotometric measurement is within a range from 38 to 66, and thus none of them are within the range of the present invention.

TABLE 1

| | ITO fine particles | | | Plasticizer for interlayer | | Dispersion stabilizer 1 | |
|---|---|---|---|---|---|---|---|
| No. | Primary particle size | Lattice constant | Amount | Kind | Amount | Kind | Amount |
| 1a | 20 | 10.12 | 10 | 3GO | 80 | Phosphate ester | 1 |
| 1b | 20 | 10.12 | 34.5 | 3GO | 31 | Phosphate ester | 3.4 |
| 1c | 20 | 10.12 | 25 | 3GO | 50 | Phosphate ester | 2.5 |
| 2 | 25 | 10.14 | 30 | 3GO | 55 | Phosphate ester | 5 |
| 3 | 80 | 10.15 | 50 | 3GO | 30 | Phosphate ester | 6 |
| 4 | 70 | 10.14 | 60 | 3GO | 10 | Phosphate ester | 4 |
| 5 | 30 | 10.11 | 20 | 3GO | 75 | Sulfate ester | 0.01 |
| 6 | 45 | 10.14 | 40 | 3GO | 45 | Sulfate ester | 2 |
| 7 | 60 | 10.16 | 10 | 3GO | 85 | Sulfate ester | 0.5 |
| 8 | 40 | 10.14 | 30 | 3GO | 55 | Polyvinyl alcohol | 2 |
| 9 | 50 | 10.15 | 50 | 3GO | 24 | Polyvinyl alcohol | 7 |
| 10 | 20 | 10.12 | 10 | 3GH | 80 | Phosphate ester | 1 |
| 11 | 20 | 10.12 | 10 | 4GO | 80 | Phosphate ester | 1 |
| 12 | 20 | 10.12 | 10 | DHA | 80 | Phosphate ester | 1 |
| 13 | 20 | 10.12 | 10 | 3GO | 79 | Sulfate ester | 2 |
| 14 | 20 | 10.12 | 10 | 3GO | 79 | Sulfate ester | 2 |
| 15 | 20 | 10.18 | 10 | 3GO | 76 | Sulfate ester | 2 |
| 16 | 210 | 10.16 | 10 | 3GO | 76 | Sulfate ester | 2 |
| 17 | 20 | 10.12 | 10 | 3GO | 78 | — | — |
| 18 | 20 | 10.12 | 10 | 3GO | 81 | — | — |
| 19 | 20 | 10.12 | 10 | 3GO | 90 | — | — |
| 20 | 20 | 10.12 | 10 | 3GO | 88 | Sulfate ester | 2 |
| 21 | 20 | 10.12 | 10 | 3GO | 87 | — | — |
| 22 | 20 | 10.12 | 10 | 3GO | 84 | Phosphate ester | 1 |
| 23 | 25 | 10.14 | 30 | 3GO | 62 | Phosphate ester | 5 |
| 24 | 20 | 10.12 | 10 | DHA | 84 | Phosphate ester | 1 |
| 25 | 20 | 10.12 | 10 | 3GO | 84 | — | — |
| 26 | 20 | 10.12 | 10 | 3GO | 88 | Higher fatty acid ester: 2% by weight | |
| 27 | 20 | 10.12 | | ITO fine particles: 30 parts by weight, Di-2-ethylhexyl phthalate: 70 parts by weight, Anionic surfactant: 3 parts by weight | | | |

| | Dispersion stabilizer 2 | | Dispersion stabilizer 3 | | Alcohols | |
|---|---|---|---|---|---|---|
| No. | Kind | Amount | Kind | Amount | Kind | Amount |
| 1a | 2-ethylhexanoic acid | 2 | Acetylacetone | 3 | Ethanol | 4 |
| 1b | 2-ethylhexanoic acid | 7 | Acetylacetone | 10.3 | Ethanol | 13.8 |
| 1c | 2-ethylhexanoic acid | 5 | Acetylacetone | 7.5 | Ethanol | 10 |
| 2 | 2-ethylbutyric acid | 2 | Acetylacetone | 1 | Methanol | 7 |
| 3 | n-hexanoic acid | 3 | Acetylacetone | 6 | Isopropanol | 5 |
| 4 | n-butyric acid | 8 | Benzoyltrifluoroacetone | 8 | Diacetone alcohol | 10 |
| 5 | n-hexanoic acid | 0.005 | Acetylacetone | 0.005 | Ethanol | 4.98 |
| 6 | 2-ethylhexanoic acid | 5 | Benzoyltrifluoroacetone | 2 | Isopropanol | 6 |
| 7 | 2-ethylbutyric acid | 1 | Benzoyltrifluoroacetone | 3 | Diacetone alcohol | 0.5 |
| 8 | n-butyric acid | 3 | Benzoyltrifluoroacetone | 5 | Methanol | 5 |
| 9 | n-hexanoic acid | 4 | Benzoyltrifluoroacetone | 7 | Diacetone alcohol | 8 |
| 10 | 2-ethylhexanoic acid | 2 | Acetylacetone | 3 | Ethanol | 4 |
| 11 | 2-ethylhexanoic acid | 2 | Acetylacetone | 3 | Ethanol | 4 |
| 12 | 2-ethylhexanoic acid | 2 | Acetylacetone | 3 | Ethanol | 4 |
| 13 | — | | Acetylacetone | 3 | Isopropanol | 6 |
| 14 | n-butyric acid | 3 | — | — | Isopropanol | 6 |
| 15 | n-butyric acid | 3 | Acetylacetone | 3 | Isopropanol | 6 |
| 16 | n-butyric acid | 3 | Acetylacetone | 3 | Isopropanol | 6 |
| 17 | n-butyric acid | 3 | Acetylacetone | 3 | Isopropanol | 6 |
| 18 | — | — | Acetylacetone | 3 | Isopropanol | 6 |
| 19 | — | | — | | — | — |
| 20 | — | | — | | — | — |
| 21 | n-butyric acid | 3 | — | | — | — |
| 22 | 2-ethylhexanoic acid | 2 | Acetylacetone | 3 | — | — |
| 23 | 2-ethylbutyric acid | 2 | Acetylacetone | 1 | — | — |

TABLE 1-continued

| 24 | 2-ethylhexanoic acid | 2 | Acetylacetone | 3 | — | — |
| 25 | — | | — | | — | Isopropanol | 6 |
| 26 | Higher fatty acid ester: 2% by weight | | | | — | — |
| 27 | ITO fine particles: 30 parts by weight, Di-2-ethylhexyl phthalate: 70 parts by weight, Anionic surfactant: 3 parts by weight | | | | — | — |

(Note)
The primary particle size is a primary average particle size (nm), the lattice constant is Å, the fatty acid ester is polyglycerin fatty acid ester, and the unit of the amount is % by weight.

TABLE 2 dispersion of ITO fine particles

| | 0.7 wt % solution | | | | | 10 wt % solution | |
| --- | --- | --- | --- | --- | --- | --- | --- |
| No. | Tv % | Ts % | Haze % | Reflection YI | Reflection measured value | Volume particle size nm | D90 nm |
| 1a | 91.9 | 64.5 | 0.4 | −8.1 | 4.6 | 43 | 75 |
| 1b | 91.9 | 64.5 | 0.4 | −8.1 | 4.7 | 43 | 75 |
| 1c | 91.9 | 64.5 | 0.4 | −8.1 | 5.0 | 43 | 75 |
| 2 | 91.7 | 64.5 | 0.5 | −8.7 | 4.7 | 44 | 76 |
| 3 | 89.2 | 60.3 | 0.8 | −18.3 | 9.3 | 75 | 152 |
| 4 | 91.8 | 66.6 | 0.6 | −11 | 5.3 | 42 | 74 |
| 5 | 91.5 | 64.1 | 0.5 | −7.5 | 5.3 | 39 | 78 |
| 6 | 91.7 | 66.6 | 0.5 | −11.3 | 4.8 | 38 | 73 |
| 7 | 91.6 | 66.4 | 0.6 | −11.3 | 5.3 | 50 | 77 |
| 8 | 91.0 | 64.3 | 0.5 | −9.8 | 4.9 | 42 | 80 |
| 9 | 90.2 | 65.6 | 0.6 | −15.3 | 4.7 | 60 | 130 |
| 10 | 91.8 | 64.5 | 0.4 | −8.5 | 4.8 | 45 | 78 |
| 11 | 91.9 | 64.5 | 0.4 | −8.1 | 5.1 | 44 | 78 |
| 12 | 91.5 | 64.0 | 0.5 | −8.9 | 4.8 | 48 | 80 |
| 13 | 91.8 | 65.5 | 0.5 | −11.5 | 4.9 | 50 | 80 |
| 14 | 91.9 | 66.1 | 0.5 | −11.9 | 5.2 | 52 | 85 |
| 15 | 91.9 | 69.2 | 0.4 | −7.9 | 4.9 | 41 | 74 |
| 16 | 80.1 | 49.8 | 1.5 | −30.8 | 68.9 | 180 | 280 |
| 17 | 82.0 | 54.0 | 2.1 | −26.0 | 40.5 | 100 | 205 |
| 18 | 81.6 | 53.7 | 2.1 | −26.0 | 72.4 | 100 | 200 |
| 19 | 80.2 | 50.6 | 3.2 | −32.6 | 82.2 | 140 | 300 |
| 20 | 89.0 | 60.5 | 1.2 | −24.0 | 53.4 | 85 | 170 |
| 21 | 81.1 | 52.8 | 2.8 | −30.5 | 73.5 | 130 | 290 |
| 22 | 91.2 | 63.8 | 1.2 | −22.5 | 50.2 | 85 | 170 |
| 23 | 90.9 | 63.5 | 1.3 | −23.0 | 52.5 | 85 | 170 |
| 24 | 82.3 | 53.5 | 2.5 | −30.0 | 72.8 | 120 | 270 |
| 25 | 81.8 | 53.8 | 2.2 | −26.5 | 49.4 | 100 | 210 |
| 26 | 84.3 | 57.8 | 1.2 | −23.5 | 39.7 | 83 | 165 |
| 27 | 84.0 | 57.4 | 1.2 | −23.8 | 42.6 | 90 | 170 |

Interlayer film for laminated glass

| No. | ITO concentration | Tv % | Ts % | Haze % | Electromagnetic transmission properties | Reflection YI | Reflection measured value | Volume particle size nm | Number of particles having a particle size of 100 nm or more | Pummel value |
| --- | --- | --- | --- | --- | --- | --- | --- | --- | --- | --- |
| 1a | 0.2 | 87.2 | 67.6 | 0.4 | 3 | −4.0 | 1.1 | 55 | 0 | 4 |
| 1b | 0.7 | 83.2 | 56.5 | 0.6 | 3 | −7.3 | 3.6 | 70 | 0 | 4 |
|  | 0.2 | 87.2 | 67.6 | 0.4 | 3 | −3.9 | 1.2 | 50 | 0 | 4 |
| 1c | 0.7 | 83.2 | 56.9 | 0.6 | 3 | −7.5 | 3.7 | 70 | 0 | 4 |
| 2 | 0.2 | 87.9 | 67.6 | 0.4 | 3 | −4.2 | 1.2 | 60 | 0 | 4 |
| 3 | 0.2 | 86.6 | 62.2 | 0.8 | 3 | −7.9 | 2.1 | 78 | 1 | 4 |
| 4 | 0.7 | 83.5 | 58 | 0.7 | 3 | −7.5 | 3.8 | 70 | 1 | 4 |
| 5 | 0.7 | 83.5 | 56.5 | 0.6 | 3 | −5.7 | 3.6 | 58 | 0 | 4 |
| 6 | 0.2 | 87.4 | 67.5 | 0.4 | 3 | −4.9 | 1.3 | 55 | 0 | 4 |
| 7 | 0.7 | 83.2 | 57.6 | 0.6 | 3 | −7.4 | 4.2 | 65 | 0 | 4 |
| 8 | 0.2 | 87.0 | 65.9 | 0.5 | 3 | −6.0 | 1.3 | 65 | 0 | 4 |
| 9 | 0.7 | 83.5 | 58 | 0.8 | 3 | −7.5 | 3.6 | 70 | 1 | 4 |
| 10 | 0.2 | 87.3 | 66.6 | 0.4 | 3 | −4.1 | 1.2 | 50 | 0 | 4 |
| 11 | 0.2 | 87.3 | 66.6 | 0.4 | 3 | −3.9 | 1.2 | 50 | 0 | 4 |
| 12 | 0.2 | 87.0 | 65.7 | 0.5 | 3 | −4.5 | 1.3 | 55 | 0 | 4 |
| 13 | 0.2 | 87.1 | 68.2 | 0.5 | 3 | −5.5 | 1.3 | 60 | 0 | 6 |
| 14 | 0.2 | 87.0 | 68.1 | 0.5 | 3 | −5.6 | 1.3 | 60 | 0 | 6 |
| 15 | 0.2 | 87.3 | 70.5 | 0.4 | 3 | −3.6 | 1.3 | 48 | 0 | 4 |
| 16 | 0.2 | 76.0 | 48.8 | 1.5 | 3 | −17.2 | 53.6 | 210 | 7 | 4 |

TABLE 2-continued

| 17 | 0.2 | 78.5 | 53.0 | 1.4 | 3 | −17.1 | 39.6 | 105 | 3 | 3 |
| 18 | 0.2 | 78.1 | 52.5 | 1.4 | 3 | −17.0 | 62.5 | 105 | 3 | 3 |
| 19 | 0.2 | 76.4 | 49.5 | 1.7 | 3 | −18.1 | 65.6 | 125 | 4 | 3 |
| 20 | 0.2 | 86.2 | 62.2 | 1.2 | 3 | −15.8 | 39.5 | 90 | 2 | 8 |
| 21 | 0.2 | 77.0 | 51.2 | 1.5 | 3 | −17.6 | 59.6 | 120 | 4 | 3 |
| 22 | 0.2 | 86.4 | 67.0 | 0.7 | 3 | −14.5 | 38.0 | 90 | 2 | 4 |
| 23 | 0.2 | 87.1 | 67.2 | 0.8 | 3 | −15.1 | 39.0 | 90 | 2 | 4 |
| 24 | 0.2 | 78.2 | 52.2 | 1.8 | 3 | −18.5 | 66.2 | 130 | 4 | 4 |
| 25 | 0.2 | 78.2 | 52.7 | 1.4 | 3 | −17.1 | 50.0 | 110 | 3 | 3 |
| 26 | 0.2 | 80.5 | 51.8 | 1.2 | 3 | −15.4 | 29.5 | 90 | 2 | 8 |
| 27 | 0.2 | 80.0 | 51.2 | 1.2 | 3 | −15.6 | 31.1 | 90 | 2 | 8 |

(Note)
The reflection YI is a reflection yellow index, the reflection value is a value measured by a goniophotometric measurement, the volume particle size is a mean volume particle size, the electromagnetic shield properties are (ΔdB), and the number of particles having a particle size of 100 nm or more is (number/μm$^2$).

TABLE 3

| | Exposure degree of interlayer film (%) | | | | | | | |
|---|---|---|---|---|---|---|---|---|
| | 100 | 90 | 85 | 60 | 40 | 20 | 10 | 5 | 2 or less |
| Pummel value | 0 | 1 | 2 | 3 | 4 | 5 | 6 | 7 | 8 |

INDUSTRIAL APPLICABILITY

The dispersion of tin-doped indium oxide fine particles of the present invention is excellent in dispersibility of tin-doped indium oxide fine particles and has high transparency at a certain angle, and is also less likely to cause solvent shock and maintains good dispersion state of tin-doped indium oxide fine particles when the dispersion is mixed with the resin. This dispersion of tin-doped indium oxide fine particles is suited for the manufacture of an interlayer film for laminated glass, and an interlayer film for laminated glass with excellent heat ray shield properties and a laminated glass including the same can be obtained by using the dispersion.

The invention claimed is:

1. A dispersion of tin-doped indium oxide fine particles, the dispersion comprising (1) tin-doped indium oxide fine particles having a primary average particle size of 0.2 μm or less, (2) a plasticizer for an interlayer film, (3) an organic solvent containing at least one alcohol as a main component, and a (4) dispersion stabilizer,
    wherein under measuring conditions of a content of the tin-doped indium oxide fine particles of 0.7% by weight based on the total weight of the dispersion and an optical path length of a glass cell of 1 mm,
    a visible light transmittance is 80% or more,
    a solar radiation transmittance at a wavelength within a range from 300 nm to 2100 nm is ¾ or less of the visible light transmittance,
    a haze value is 1.0% or less,
    a reflection yellow index is −20 or more,
    the content of the dispersion stabilizer is from 6% to 20.7% by weight based on the total weight of the dispersion, wherein the dispersion stabilizer comprises (i) a chelate at a content in a range of 3.3 to 30 parts by weight per 100 parts by weight of the tin-doped indium oxide fine particles, (ii) an organic acid at a content in a range of 6.0 to 20.3 parts by weight per 100 parts by weight of the tin-doped indium oxide fine particles, and (iii) a phosphate ester-based compound at a content in a range of 6.7 to 16.7 parts by weight per 100 parts by weight of the tin-doped indium oxide fine particles,
    the content of the tin-doped indium oxide fine particles is from 10% to 60% by weight based on the total weight of the dispersion,
    the content of the alcohol is from 4 to 13.8% by weight based on the total weight of the dispersion, and
    the content of the plasticizer is from 10% to 80% by weight based on the total weight of the dispersion.

2. The dispersion of tin-doped indium oxide fine particles according to claim 1,
    wherein instead of the reflection yellow index being −20 or more, or with the reflection yellow index being −20 or more,
    under measuring conditions of the optical path length of the glass cell of 1 mm, a reflection value at 0 degrees among reflected light distribution at an incidence angle of 45 degrees measured by a goniophotometer is 30 or less.

3. The dispersion of tin-doped indium oxide fine particles according to claim 1,
    wherein the plasticizer for an interlayer film is at least one selected from the group consisting of dihexyl adipate, triethylene glycol di-2-ethylhexanoate, tetraethylene glycol di-2-ethylhexanoate, triethylene glycol di-2-ethyl butyrate, tetraethylene glycol di-2-ethyl butyrate, tetraethylene glycol di-heptanoate, and triethylene glycol di-heptanoate.

4. The dispersion of tin-doped indium oxide fine particles according to claim 1,
    wherein the at least one alcohol comprises at least one selected from the group consisting of methanol, ethanol, propanol, isopropanol, n-butanol, isobutanol, sec-butanol, tert-butanol, lauryl alcohol, diacetone alcohol, cyclohexanol, ethylene glycol, diethylene glycol, and triethylene glycol.

5. The dispersion of tin-doped indium oxide fine particles according to claim 1,
    wherein the phosphate ester-based compound is at least one selected from polyoxyethylene alkyl ether phosphoric acid ester, alkyl ether phosphoric acid ester, and polyoxyethylene alkyl phenyl ether phosphoric acid ester.

6. The dispersion of tin-doped indium oxide fine particles according to claim 1,
    wherein, when a content of the tin-doped indium oxide fine particles is adjusted to 10.0% by weight based on the total weight of the dispersion by diluting a dispersion of tin-doped indium oxide fine particles having the content of the tin-doped indium oxide fine particles of more than 10.0% by weight based on the total weight of the dispersion, or when a content of the tin-doped indium oxide fine particles is adjusted to 40.0% by weight based on the total weight of the dispersion by diluting a dispersion of tin-doped indium oxide fine particles having the content of the tin-doped indium oxide fine particles of more than 40.0% by weight based on the total weight of the dispersion, a mean volume particle size of the tin-doped indium oxide fine particles is 80 nm or less, and a particle size at 90% accumulation (D90) is 160 nm or less.

7. The dispersion of tin-doped indium oxide fine particles according to claim 1, wherein a lattice constant of a tin-doped indium oxide fine particle crystal is from 10.11 to 10.16 Å.

8. A method for manufacturing the dispersion of tin-doped indium oxide fine particles according to claim 1, the method comprising mixing an organic solvent containing at least one alcohol as a main component, a dispersion stabilizer, tin-doped indium oxide fine particles having a primary average particle size of 0.2 μm or less, and plasticizer for an interlayer film, thereby dispersing the tin-doped indium oxide fine particles, wherein the content of the dispersion stabilizer is from 6% to 20.7% by weight based on the total weight of the dispersion, wherein the dispersion stabilizer comprises (i) a chelate at a content in a range of 3.3 to 30 parts by weight per 100 parts by weight of the tin-doped indium oxide fine particles, (ii) an organic acid at a content in a range of 6.0 to 20.3 parts by weight per 100 parts by weight of the tin-doped indium oxide fine particles, and (iii) a phosphate ester-based compound at a content in a range of 6.7 to 16.7 parts by weight per 100 parts by weight of the tin-doped indium oxide fine particles, and the content of the tin-doped indium oxide fine particles is from 10% to 60% by weight based on the total weight of the dispersion, the content of the alcohol is from 4% to 13.8% by weight based on the total weight of the dispersion, and the content of the plasticizer is from 10% to 80% by weight based on the total weight of the dispersion.

9. The method for manufacturing a dispersion of tin-doped indium oxide fine particles according to claim 8, wherein a mixed solution containing the organic solvent containing at least one alcohol as a main component, the dispersion stabilizer, and the tin-doped indium oxide fine particles is prepared, and this mixed solution is mixed with the plasticizer for an interlayer film to obtain a dispersion of tin-doped indium oxide fine particles.

10. The method for manufacturing a dispersion of tin-doped indium oxide fine particles according to claim 9, wherein the mixed solution containing the organic solvent containing at least one alcohol as a main component, the dispersion stabilizer, and the tin-doped indium oxide fine particles is prepared, and this mixed solution is added to the plasticizer for an interlayer film, or the plasticizer for an interlayer film is added to this mixed solution, thereby dispersing the tin-doped indium oxide fine particles.

11. The method for manufacturing a dispersion of tin-doped indium oxide fine particles according to claim 9, wherein a plasticizer containing an organic solvent containing at least one alcohol as a main component or a dispersion stabilizer is used as the plasticizer for an interlayer film.

12. A dispersion of tin-doped indium oxide fine particles, the dispersion comprising (1) tin-doped indium oxide fine particles having a primary average particle size of 0.2 μm or less, (2) a plasticizer for an interlayer film, (3) an organic solvent containing at least one alcohol as a main component, and (4) a dispersion stabilizer, wherein under measuring conditions of a content of the tin-doped indium oxide fine particles of 0.7% by weight based on the total weight of the dispersion and an optical path length of a glass cell of 1 mm, a visible light transmittance is 80% or more, a solar radiation transmittance at a wavelength within a range from 300 nm to 2100 nm is ¾ or less of the visible light transmittance, a haze value is 1.0% or less, a reflection yellow index is −20 or more, the dispersion stabilizer comprises a chelate, an organic acid, and a phosphate ester-based compound, the content of the tin-doped indium oxide fine particles is from 10% to 60% by weight based on the total weight of the dispersion, in the dispersion, the content of the organic acid is in a range of 2% to 8% by weight based on the total weight of the dispersion, the content of the phosphate ester-based compound is in a range of 1% to 6% by weight based on the total weight of the dispersion, the content of the chelate is in a range of 1% to 10.3% by weight based on the total weight of the dispersion, the content of the alcohol is from 4% to 13.8% by weight based on the total weight of the dispersion, and the content of the plasticizer is from 10% to 80% by weight based on the total weight of the dispersion, respectively.

13. The dispersion of tin-doped indium oxide fine particles according to claim 12, wherein the total content of the chelate, the organic acid, and phosphate ester-based compound is in a range of 6 to 20.7% by weight based on the total weight of the dispersion.

* * * * *